United States Patent
Ota et al.

(10) Patent No.: US 7,005,466 B2
(45) Date of Patent: Feb. 28, 2006

(54) SILICONE RUBBER COMPOSITION

(75) Inventors: Kenji Ota, Chiba (JP); Hiroshi Honma, Chiba (JP)

(73) Assignee: Dow Corning Toray Silicone Company, Ltd. (JP)

( * ) Notice: Subject to any disclaimer, the term of this patent is extended or adjusted under 35 U.S.C. 154(b) by 180 days.

(21) Appl. No.: 10/479,077

(22) PCT Filed: May 29, 2002

(86) PCT No.: PCT/JP02/05244

§ 371 (c)(1),
(2), (4) Date: Nov. 26, 2003

(87) PCT Pub. No.: WO02/096992

PCT Pub. Date: Dec. 5, 2002

(65) Prior Publication Data

US 2004/0236014 A1 Nov. 25, 2004

(30) Foreign Application Priority Data

May 31, 2001 (JP) .................................. 2001-165944

(51) Int. Cl.
*C08K 5/5419* (2006.01)

(52) U.S. Cl. .................. 524/267; 524/268; 524/425; 524/588; 528/24; 528/32

(58) Field of Classification Search ................ 524/267, 524/268, 425, 588; 528/24, 32
See application file for complete search history.

(56) References Cited

FOREIGN PATENT DOCUMENTS

| JP | 05032914 A | * | 2/1993 |
| JP | 10130429 A | * | 5/1998 |

* cited by examiner

*Primary Examiner*—Margaret G. Moore
*Assistant Examiner*—Marc S Zimmer
(74) *Attorney, Agent, or Firm*—Robert L. McKellar; McKellar IP Law, PLLC

(57) ABSTRACT

To provide a silicone rubber composition for wiper blades, which, due excellent moldability and ability to closely repeat the shape of the die during extrusion, is suitable for forming wiper blades of complicated shapes; to provide a method of manufacturing the aforementioned composition. A silicone rubber composition for a wiper blade comprising (A), a polydiorganosiloxane, (B) a finely divided, reinforcing silica filler, (C) orthoboric acid or metaboric acid, (D) a powdered calcium carbonate, (E) an organic peroxide curing agent, and an additive for improving water-repellent properties of a wiper blade made from said composition, comprising one or both of (F) a polyorganosiloxane having a viscosity of 1 to 10000 mPa·s and containing in one molecule at least two silicon-bonded hydrogen atoms and (G) a polydiorganosiloxane having a viscosity of 1 to 10000 mPa·s; a method of manufacturing the aforementioned composition.

12 Claims, 1 Drawing Sheet

[Fig. 1]
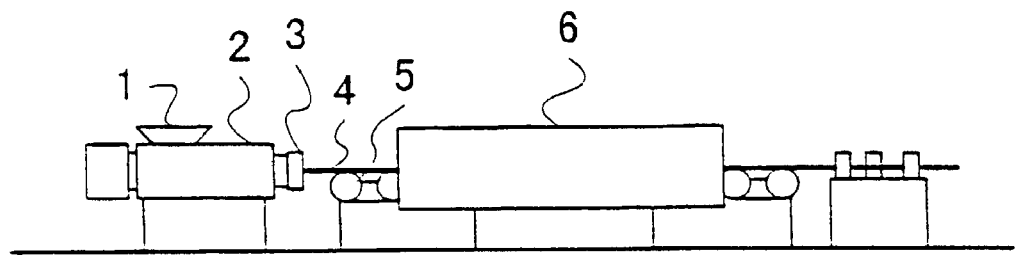
[Fig. 2]
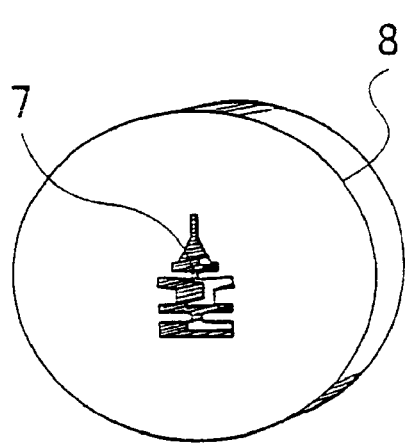
[Fig. 3]
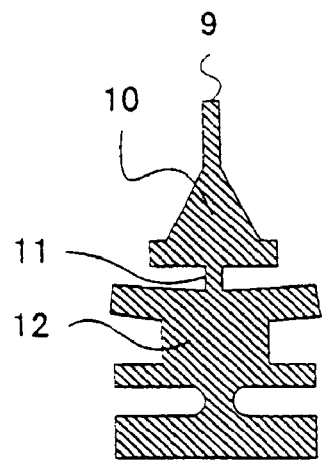
[Fig. 4]
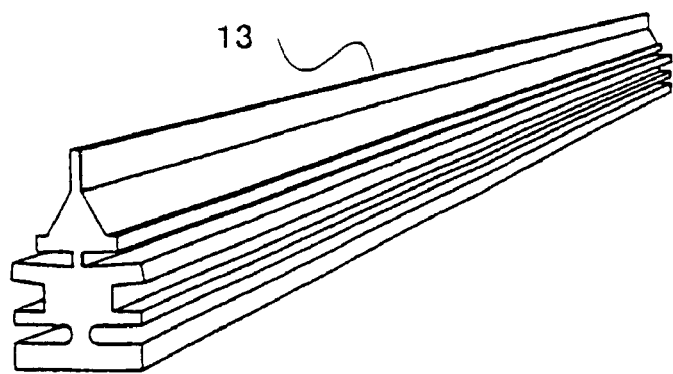

SILICONE RUBBER COMPOSITION

The present invention relates to a silicone rubber composition which is particularly suitable for the manufacture of windscreen wiper blades for automobiles and the like. More specifically, the invention relates to a silicone rubber composition, which, due excellent moldability and ability to closely reproduce the shape of the die during extrusion, is suitable for forming wiper blades of complicated shapes. The invention also relates to a method of manufacturing the aforementioned composition.

Japan Patent Application Publication No. Hei 10-16721 describes a silicone rubber material for wiper blades containing a silicone oil that has poor compatibility with silicone gum as a means of suppressing vibrations and the so-called locking phenomenon. The resulting mixture produces a water-repellent film on a glass surface. Japan Patent Application Publication No. Hei 1-247253 describes a wiper blade made of a silicone rubber containing a silicone-based water repellent. However, the introduction of a silicone oil and/or a silicone-based water-repellent agent reduces plasticity and green strength of the silicone rubber composition, thus making it more difficult to reproduce the shape of a die cavity during extrusion and to rationalize the production.

Japan Patent Application Publication No. Hei 9-143370 describes a silicone rubber composition with good extrusion moldability comprising an organopolysiloxane, silica filler, orthoboric acid or metaboric acid, a dialkylpolysiloxane having —OH terminal groups and a curing agent.

Japan Patent Application Publication No. Hei 5-208659, (equivalent to U.S. Pat. No. 5,283,927) describes a silicone rubber composition for use in wiper blades comprising a dimethylvinylsiloxy-terminated polydiorganosiloxane, an extending filler comprising siliceous particles such as ground quartz and celite or calcareous particles such as chalk, a reinforcing filler such as fumed silica or precipitated silica, and organic peroxide or platinum catalysts. But the resulting silicone rubber composition does not have enough improved green strength thereby improved suitability for extrusion. Addition of the aforementioned extending filler results in an increase in plasticity of the composition with time, i.e. "crepe hardening", and/or a decrease in dimensions i.e. "mill shrinkage". An excessive increase in the amount of extending filler in an extrudable silicone rubber composition often causes an increase in wear on the inner metal walls of extruder barrels which in turn may cause the silicone rubber composition being extruded therethrough to be discoloured due to the release of metal particles caused by the aforementioned wearing of extruder barrel inner walls. Furthermore, an increased amount of extending filler diminishes water-repellent effects of silicone rubber based wiper blades on glass surfaces and decreases the resistance of wiper blades to tearing, and as such their long term endurance.

Japan Patent Application Publication No. 2001-181505, which was filed on 24 Dec. 1999 and published after the priority date of this application on 3 Jul. 2001 describes a silicone rubber composition comprising 100 parts by weight of a polyorganosiloxane gum, 25 to 100 parts by weight of a finely divided, reinforcing silica filler, 0.005 to 5.00 parts by weight of orthoboric acid or metaboric acid, 5 to 100 parts by weight of a powdered calcium carbonate, and a curing agent in an amount to be sufficient for curing the composition of the present invention. This application is directed to a silicone rubber composition having excellent extrusion moldability that can retain the shape of a die and can mold extrusion-molded articles having complicated shapes.

As a result of extensive study aimed at the solutions of the above problems, the inventors arrived at the present invention. It is an object of the present invention to provide a silicone rubber composition, which, due to its excellent moldability and ability to closely reproduce the shape of the die during extrusion, is suitable for forming, for example, wiper blades of intricate shapes which have excellent water-repellent properties on the front glass of a vehicle. Another object of the present invention is to provide a method of manufacturing the aforementioned composition.

The invention provides a silicone rubber composition comprising the following components:
(A) 100 parts by weight of a polyorganosiloxane gum,
(B) 25 to 100 parts by weight of a finely divided, reinforcing silica filler,
(C) 0.005 to 5.00 parts by weight of orthoboric acid or metaboric acid,
(D) 5 to 100 parts by weight of a powdered calcium carbonate,
(E) an organic peroxide curing agent in an amount sufficient to effect curing of the composition,
and an additive for improving water-repellent properties comprising
(F) a polyorganosiloxane having a viscosity of 1 to 10,000 mPa·s and containing in one molecule at least two silicon-bonded hydrogen atoms; or a mixture of Component (F) with
(G) a polydiorganosiloxane having a viscosity of 1 to 10,000 mPa·s;
in an amount of 0.1 to 20 parts by weight based on 100 parts by weight of said Component (A).

Component (A) is a polyorganosiloxane which preferably has an average unit formula $R_a SiO_{(4-a)}/2$ which may have a linear or partially-branched structure but is preferably linear. Each R may be the same or different. R is a substituted or non-substituted monovalent hydrocarbon group which may be for example an alkyl group, such as a methyl, ethyl, propyl, butyl, and octyl groups; aryl groups such as phenyl and tolyl groups; aralkyl groups; alkenyl groups for example, vinyl, allyl, butenyl, hexenyl, and heptenyl groups; and halogenated alkyl groups for example chloropropyl and 3,3,3-trifluoropropyl groups. Component (A) may be-terminated by any of the above groups or with hydroxyl groups. When R is an alkenyl group the alkenyl group is preferably vinyl group or hexenyl group. Indeed alkenyl groups may be present in Component (A) on terminal groups and/or, polymer side chains. It is preferred for Component (A) to have a weight-average degree of polymerization within the range of 1,000 to 20,000.

One or more of the following are preferred as Component (A): dimethylvinylsiloxy-terminated polydimethylsiloxane, trimethylsiloxy-terminated polydimethylsiloxane, trimethylsiloxy-terminated copolymer of methylvinylsiloxane and dimethylsiloxane, dimethylvinylsiloxy-terminated copolymer of methylvinylsiloxane and dimethylsiloxane, dimethylhydroxysiloxy-terminated polydimethylsiloxane, dimethylhydroxysiloxy-terminated copolymer of methylvinylsiloxane and dimethylsiloxane, methylvinylhydroxysiloxy-terminated copolymer of methylvinylsiloxane and dimethylsiloxane, dimethylhexenylsiloxy-terminated polydimethylsiloxane, trimethylsiloxy-terminated copolymer of methylhexenylsiloxane and dimethylsiloxane, dimethylhexenylsiloxy-terminated copolymer of methylhexenylsiloxane and dimethylsiloxane, dimethylvinylsiloxy-terminated copolymer of methylphenylsiloxane and dimethylsiloxane, dimethylhexenylsiloxy-terminated copolymer of methylphenylsiloxane and dimethylsiloxane, dimethylvinylsiloxy-terminated copolymer of methyl(3,3,3-trifluoropropyl)siloxane and dimethylsiloxane, and dimethylhexenylsiloxy-terminated copolymer of methyl(3,3,3-trifluoropropyl)siloxane and dimethylsiloxane.

Component (B) is a finely divided, reinforcing silica filler which is utilized to improve green strength of the composition of the present invention and mainly to impart excellent mechanical strength to the resulting wiper blade produced by curing the composition of the invention. Preferably Component (B) is one or a mixture of fumed silica or a similar dry-process silica, a precipitated silica or a similar wet-process silica. The silica may optionally be treated with an organohalosilane, organoalkoxysilane, organodisilazane, dimethylsilanol-terminated polydiorganosiloxane, cyclopolydiorganosiloxane or a similar organosilicon compound. Preferably the silica has a BET specific surface area of at least 50 $m^2/g$ and most preferably of at least 100 $m^2/g$. Component (B) is used in an amount of 25 to 100 parts by weight based on 100 parts by weight of the Component (A). If the Component (B) is used in an amount less than the lower limit of the above range, the composition will not acquire a sufficient green strength, so that the wiper blade obtained after curing will not possess enough mechanical strength. If, on the other hand, the amount of the Component (B) exceeds the upper limit of the recommended range, it will be difficult to mix with the Component (A).

Component (C) is orthoboric acid or metaboric acid, and is utilized to the improve green strength of the composition of the present invention in order to protect the extruded body of the composition when unloaded from the die of an extruder from deformation under its own gravity. The aforementioned acids can be used individually or in a combination. Component (C) is present in the composition of the present invention in an amount of 0.005 to 5.00 parts by weight and preferably from 0.01 to 1.00 parts by weight based on 100 parts by weight of the Component (A). If the amount of this component is below the lower limit, it will be impossible to reproduce the shape of the die in extrusion, so that the obtained wiper blade will have a distorted configuration. Exceeding of the upper limit will cause fluctuations in the output of the extruder that either will lead to deviations from the correct geometry of a cured product made from the composition of the present invention, such as the wiper blades or will cause deposition of crystals of this component on the surfaces of the cured product.

Component (D) is a powdered calcium carbonate and is utilized to provide dimensional stability of the formed product; it prevents the phenomena of crepe hardening and mill shrinkage, and also prevents formation of products of wear resulting from abrasion of the inner walls of the extruder with the particles of the composition of the present invention thereby preventing formation of black stripes on the surface of the extruded article. Component (D) may be a precipitated calcium carbonate or a ground calcium carbonate. Precipitated calcium carbonate is produced by removing water from a calcium carbonate slurry obtained by reacting micro porous lime with carbon dioxide and subsequently drying the product. The ground calcium carbonate is produced by grinding calcium carbonate and classifying the obtained ground product. Ground calcium carbonate used as Component (D) has preferably a BET specific surface area of less than 8 $m^2/g$, may be surface-treated with a fatty acid, and has preferably an oil absorption (according to JIS K 5101) within the range of 15 to 50 ml/100 g. Component (D) can be represented by calcium carbonates produced, e.g., by Toyo Fine Chemical Co., Ltd. or by Shiraishi Industries Co. Ltd. under the following trade names: Whiton P-10, Whiton P-30, Whiton P-50, Whiton P-70, Whiton H, HAKUENKA-CC, HAKUENKA-CCR, Unibur-70, and Homocal D. Component (D) is used in an amount of from 5 to 100 parts by weight, preferably 5 to 50 parts by weight based per 100 parts by weight of Component (A). If Component (D) is used in an amount less than the lower limit of the range, it would be difficult to prevent the phenomena of return plasticity and mill shrinkage. If, on the other hand, the amount of Component (D) used exceeds the upper limit of the range, it would be difficult to mix Component (D) with the Component (A).

Component (E) is intended to cause curing of the composition of the present invention. Any appropriate curing agent may be utilized, for example it may be an organic peroxide, such as: a benzoyl peroxide, di-t-butylperoxide, 2.5-dimethyl-2.5-di (t-butylperoxide)hexane, bis(ortho-methylbenzoyl)peroxide, bis(meta-methylbenzoyl) peroxide, bis(para-methylbenzoyl)peroxide, or a similar monomethylbenzoyl peroxide, bis(2,4-dimethylbenzoyl) peroxide, or a similar dimethylbenzoyl peroxide, bis(2,4,6-trimethylbenzoyl)peroxide, or a similar trimethylbenzoyl peroxide. Component (E) is added in any appropriate amount to ensure that the composition will cure and preferably in an amount of 0.1 to 10 parts by weight, for each 100 parts by weight of the sum of Components (A) to (D).

The additive for improving water-repellent properties is a low-viscosity polyorganosiloxane which is included in the composition to improve water-repellent properties against water, for example on the front glass of a vehicle when the composition in accordance to the present invention is used to make wiper blades it is to be understood that reference to wiper blades in the following description is for example only. Whilst the making of wiper blades is particularly suited to the composition of the present invention any suitable product may be manufactured using the composition of the present invention. It comprises (F) a polyorganosiloxane having a viscosity of 1 to 10,000 mPa·s and containing in one molecule at least two silicon-bonded hydrogen atoms; or a mixture of Component (F) with (G) a polydiorganosiloxane having a viscosity of 1 to 10,000 mPa·s;

in an amount of 0.1 to 20 parts by weight based on 100 parts by weight of said Component (A).

Component (F) may have a linear, partially-branched or cyclic molecular structure, but is most preferably linear. Preferably Component (F) comprises substituted and/or non-substituted monovalent hydrocarbon groups for example, alkyl groups such as methyl, ethyl, propyl, butyl, and octyl groups; aryl groups such as phenyl and tolyl groups; halogenated alkyl groups such as chloropropyl, 3,3,3-trifluoropropyl groups. Most preferably the hydrocarbon groups are methyl groups. It is preferred that Component (F) does not contain any silicon-bonded organic group containing an unsaturated aliphatic bond.

Component (F) may comprise, for example, trimethylsiloxy-terminated polymethylhydrogensiloxane, trimethylsiloxy-terminated copolymer of methylhydrogensiloxane and dimethylsiloxane, dimethylhydrogensiloxy-terminated polydimethylsiloxane, dimethylhydrogensiloxy-terminated copolymer of methylhydogensiloxane and dimethylsiloxane, cyclic polymethylhydrogensiloxane, cyclic copolymer of methylhydrogensiloxane and dimethylsiloxane, or combination of two or more of the above compounds.

Component (G) may have a linear, partially-branched or cyclic molecular structure, but preferably Component (G)

has a linear structure. It is preferable that silicone atom-bonded organic groups of Component (G) comprise substituted or non-substituted monovalent hydrocarbon groups, for example alkyl groups such as methyl, ethyl, propyl, butyl, and octyl groups, aryl groups such as phenyl and tolyl groups, or halogenated alkyl groups such as chloropropyl, 3,3,3-trifluoropropyl groups. Most preferable among these are methyl groups. It is most preferred that the silicon-bonded organic groups in Component (G) do not have aliphatic unsaturated bonds.

Component (G) may comprise, for example, trimethylsiloxy-terminated polydimethylsiloxane, a trimethylsiloxy-terminated polymethylphenylsiloxane, trimethylsiloxy-terminated copolymer of methylphenylsiloxane and dimethylsiloxane, trimethylsiloxy-terminated polymethyl(3,3,3-trifluoropropyl)siloxane, trimethylsiloxy-terminated copolymer of methyl(3,3,3-trifluoropropyl) siloxane and dimethylsiloxane, cyclic polydimethylsiloxane, cyclic polymethylphenylsiloxane, or combinations of two or more of the aforementioned polydiorganosiloxanes.

Both Components (F) and (G) have a viscosity of from 1 to 10,000 mPa·s. If the viscosity of either or both of these components are below the lower limit of the range, this would impair conditions for handling the composition in the production. If, on the other hand, the aforementioned viscosity exceeds the upper limit of the range, it would be impossible to impart sufficient water-repellent properties against water on the front glass of a vehicle.

It is preferred that Component (F) is used alone or in combination with Component (G). Cumulatively Component (F) or Components (F) and (G) are added in an amount of 0.1 to 20 parts by weight, preferably 1 to 8 parts by weight, for each 100 parts by weight of Component (A). If they are added in an amount less than the lower limit, it would be impossible to impart sufficient water-repellent properties against water on the front glass of a vehicle. If, on the other hand, the aforementioned components are used in an amount exceeding the upper limit, this would impair conditions for handling the composition in the production and lead to distortions in the shape of the wiper blades formed.

It should be noted that Component (C) imparts high green strength to the composition and improves its extrudability, even when a low-viscosity polyorganosiloxanes, such as Component (F) or Components (F) and (G) are added for improving water-repellent properties against water on the front glass of a vehicle Additional optional ingredients may be added to the composition, in amounts which will not jeopardize the functioning of the present invention, these may include any one or more of cure inhibitors, pigments, for example carbon black, red iron oxide, and titanium oxide, heat-resistant agents, for example rare-earth oxides, rare-earth hydroxides, cerium silanolate, and cerium fatty acid salts, combustion retarders, release agents, organic blowing agents, conductive fillers for removal of electrostatic charges, and plasticisers.

The silicone rubber composition may be produced by any appropriate method for example, the following two step process:

i. preparing a silicone rubber base compound by heating and kneading the following components at a temperature of at least 80° C.:

(A) a polyorganosiloxane, (B) a finely divided, reinforcing silica filler, and (C) orthoboric acid or metaboric acid;

ii. combining the silicone rubber base compound obtained in Step i with (D) powdered calcium carbonate, and then adding (E) an organic peroxide curing agent;

and adding an additive for improving water-repellent properties comprising:

(F) a polyorganosiloxane having a viscosity of 1 to 10,000 mPa·s and containing in one molecule at least two silicon-bonded hydrogen atoms; or a mixture of Component (F) with (G) a polydiorganosiloxane having a viscosity of 1 to 10,000 mPa·s;

in an amount of 0.1 to 20 parts by weight based on 100 parts by weight of said Component (A), at any time during step ii.

Components (A), (B), and (C) are preferably kneaded in combination with heating in aforementioned Step 1 in order to uniformly disperse Component (C) in the silicone rubber base compound. Heating is preferably carried out at a temperature of at least 80° C. However, when Component (C) is orthoboric acid, it is more preferred to conduct heating at a temperature of from 100 to 250° C., and most preferably from 150 to 200° C. If Component (C) is metaboric acid or a mixture of metaboric acid and orthoboric acid, kneading is preferably carried out with heating at a temperature of from 170 to 200° C. If heating is conducted at a temperature below the lower limit, it is difficult to disperse Component (C) uniformly in the silicone rubber compound, and therefore a longer kneading time may be required. Furthermore, it would be difficult to maintain the composition of the present invention at a sufficient green strength. If, on the other hand, the heating temperature is above 250° C., excessive breakage may occur in molecular chains of Component (A). For preliminary dispersion of Component (B) in Component (A), Components (A), (B), and (C) may be first preheated and kneaded at a temperature below 80° C. and then kneaded at a higher temperature within the recommended range.

Component (F) or Components (F) and (G) may be mixed either directly, or as a master batch formed by mixing with silica or another suitable powdered material into the silicone rubber base compound.

Equipment needed for manufacturing the composition of the present invention may comprise a conventional mixer used for manufacturing silicone rubber compositions, such as a kneader-mixer or a continuous-action double-screw kneader-extruder.

The above-described composition of the present invention is suitable for use as an extrudable silicone rubber composition for wiper blades, which possesses an improved green strength and capacity of maintaining its shape, therefore possesses excellent moldability and may accurately reproduce the shape of the die cavity. The aforementioned characteristics are not impaired by an addition of the low viscosity additives for improving water repellent properties of a wiper blade made from said composition. Furthermore, a wiper blade made from the above-described composition of the present invention has improved water-repellent properties against water on a glass surface.

BRIEF DESCRIPTION OF THE DRAWINGS

The present invention will now be illustrated with the help of a number of examples in which all viscosity values were measured at 25° C., and all parts are parts by weight; and the following Figures in which:

FIG. 1 is a schematic view of the apparatus utilized in the extrusion process of the composition of the present invention;

FIG. 2 is a view of a die used to form a wiper blade;

FIG. 3 is a cross section of a wiper blade; and

FIG. 4 is an external view of a wiper blade produced in Examples of the present invention.

COMPARATIVE EXAMPLE 1

A uniform mixture in accordance with the composition described in Japanese Patent Application Publication No. 2001-181505 was prepared by mixing the following components:

i. 100 parts of a dimethylvinylsiloxy-terminated copolymer gum of methylvinylsiloxane and dimethyl siloxane, having a 5,000 weight-average degree of polymerization and containing 99.97 mole % dimethylsiloxane units and 0.13 mole % methylvinylsiloxane units;

ii. 45 parts of a fumed silica having a 200 $m^2/g$ BET specific surface area;

iii. 0.05 parts of orthoboric acid; and 12 parts of a 30 mP·s dimethylhydroxysiloxy-terminated polydimethylsiloxane plasticiser.

The components were uniformly mixed in a kneader-mixer at a temperature below 80° C. The resulting mixture was then kneaded for 45 min. at 175° C. and cooled to a temperature below 80° C. The mixture was then combined and uniformly mixed with 15 parts of a powdered calcium carbonate (the product of Toyo Fine Chemical Co., Ltd.; trademark "Whiton P-30"; BET specific surface area: 1.2 $m^2/g$; oil absorption: 40 ml/100 g), to form a silicone rubber base composition.

1.5 parts per 100 parts of the silicone rubber base composition of a silicone oil paste containing 50 wt. % bis(paramethylbenzoyl)peroxide was added to the silicone rubber base composition and the resulting mixture was uniformly kneaded between two rollers to form a final silicone rubber composition.

Referring now to the drawings, the final silicone rubber composition was introduced through raw-material inlet 1 of single-screw extruder 2 and was transported through extruder 2 to extruder head 3 containing die 8. Extruded silicone rubber composition passing through die 8 by way of orifice 7 has a cross-section suitable for use as a wiper blade of the type shown in FIG. 3. The resulting extruded silicone rubber composition in the form of a continuous wiper blade is then transferred onto a conveyor belt 5 which, in turn, is continuously passed through a 7 meter long horizontal hot-air curing oven 6. As a result of curing, wiper blade 13, having a cross section shown in FIG. 3, was produced. Die 8 was arranged in extruder head 3 as shown in FIG. 2, so that the wiper blade 13 was placed onto conveyor belt 5 with the wiping edge 9 of wiper blade 13 directed upward. The curing temperature in hot-air curing oven 6 was 250° C., and the product was transported through the oven 6 with the linear speed of 3 m/min. In the case of comparative example 1, the obtained silicone-rubber wiper blade reproduced all the details of the cross section 7 of die 8, had no deviations from linearity in the longitudinal direction, and was free of strains. The surface was smooth and had an attractive appearance.

In order to study the water-repellent properties against water on a glass surface, the wiper blade produced from the aforementioned silicone rubber was installed on a real vehicle and tested by wiping the front glass using the following procedure:

the front glass windshield of the car was cleaned and/or polished until water-repellancy on the glass surface had disappeared.

After installation the wiper blade under assessment was operated with reciprocating swings for 5 minutes at a rate of one reciprocation of the wiper per second, while water was dripped onto the glass at the rate of 100 $cm^3$/min.

After 5 minutes, water was completely wiped off from the surface of the glass with a clean cloth, and the water-repellancy of the wiper blade was tested by firstly dripping water onto the glass (without the operation of the wiper blade) and the shape and behaviour of the resulting drops of water were assessed as follows:

A good result was achieved when the water drops on the surface of the windscreen were distinctly drop shaped with a high contact angle observed and said water drops were easily blown away.

A bad result is indicated by the term "none" in the following tables and was achieved when there was only a slight or no change of water-repellent of the glass surface compared with initial condition, i.e. the water spread over the glass in the form of a thin layer with a low contact angle.

The above test procedure was followed for all examples and comparative examples where the resulting extruded blade enabled the test to be carried out.

COMPARATIVE EXAMPLE 2

A silicone rubber composition was prepared by the same method as in Practical Example 1, with the exception that the orthoboric acid was excluded from the composition as will be seen in Table 1. A wiper blade was then produced using the resulting silicone rubber composition by the method described in Comparative Example 1. The resulting silicone rubber wiper blade produced from the aforementioned composition had deviations from the correct profile and was produced with a curved squeegee blade 10 and/or neck portions 11, and a distorted lower part of the holding portion 12 as compared to a correctly formed blade profile as seen in FIG. 3, or with sagging projections on the holding portion. The cross section of the wiper blade was not an exact replica of the die cavity and the extruded product could not maintain its shape and deformed under its own gravity on the conveyor belt and in the hot-air curing oven prior to curing. The surface was smooth, glossy, and had good appearance.

Results of tests described in aforementioned Comparative Examples 1 and 2 are given in Table 1.

TABLE 1

|  | (Units) | Comp. Ex. 1 | Comp. Ex. 2 |
| --- | --- | --- | --- |
| Polyorganosiloxane gum | wt. parts | 100 | 100 |
| Fumed Silica | wt. parts | 45 | 45 |
| Orthoboric acid | wt. parts | 0.05 | — |
| Powdered calcium carbonate | wt. parts | 15 | 15 |
| Bis(paramethylbenzoyl) peroxide (50 wt. % in mixture with silicone oil) | wt. parts for each 100 wt. parts of silicone rubber base compound | 1.5 | 1.5 |
| Extrudability of wiper blade | | | |
| Shape | | Good | Deformation of the entire profile |
| Surface | | Good | Good |
| Water-repellent properties on glass surface | | None | NA |

(*) Test was not conducted or was not practically possible.

EXAMPLE 1

A silicone rubber composition was prepared by the same method as in Comparative Example 1, with the exception that along with a powdered calcium carbonate, the composition of the invention was combined with 1 part of a 100 mPa·s viscosity trimethylsiloxy-terminated polydimethylsiloxane for each 100 parts by weight of the copolymer gum of methylvinylsiloxane and dimethylsiloxane and with 1 part of a 5 mPa·s viscosity trimethylsiloxy-terminated copolymer of methylhydrogensiloxane and dimethylsiloxane for each 100 parts by weight of the copolymer gum. A wiper blade was extruded from the obtained composition by the same method as in Comparative Example 1. The produced wiper blade had a correct cross-sectional configuration that clearly reproduced the shape of the die cavity. The wiper blade was free of warping, strains, and deviations from linearity. The surface of the extruded product was smooth and had an attractive appearance. Test of the produced wiper blade with regard to water-repellent properties against water on the glass surface showed that water drops had a round shape, small dimensions, and could easily flow down from the glass. In other words, the wiper blade demonstrated good water-repellent properties.

EXAMPLE 2

A silicone rubber composition was prepared by the same method as in Comparative Example 1, with the exception that along with a powdered calcium carbonate, the composition of the invention was combined with 2 parts of a 100 mPa·s viscosity trimethylsiloxy-terminated polydimethylpolysiloxane for each 100 parts by weight of the copolymer gum of methylvinylsiloxane and dimethylsiloxane. A wiper blade was extruded from the resulting composition by the method of Comparative Example 1. The resulting silicone rubber wiper blade had a correct cross-sectional configuration that clearly reproduced the shape of the die cavity. The wiper blade was free of warping, strains, and deviations from linearity. The surface of the extruded product was smooth and had an attractive appearance. Test of the produced wiper blade with regard to water-repellent properties against water on the glass surface showed that water drops had a round shape, small dimensions, and could easily flow down from the glass. In other words, the test confirmed that the wiper blade demonstrated good water-repellent properties.

EXAMPLE 3

A silicone rubber composition was prepared by the same method as in Comparative Example 1, with the exception that along with a powdered calcium carbonate, the composition of the invention was combined with 2 parts of a 5 mPa·s viscosity trimethylsiloxy-terminated copolymer of methylhydrogensiloxane and dimethylsiloxane for each 100 parts by weight of the copolymer gum of methylvinylsiloxane and dimethylsiloxane. A wiper blade was extruded from the resulting composition by the same method as in Comparative Example 1. The resulting wiper blade had a correct cross-sectional configuration that clearly reproduced the shape of the die cavity. The wiper blade was free of warping, strains and deviations from linearity. The surface of the extruded product was smooth and had an attractive appearance. Test of the produced wiper blade with regard to water-repellent properties against water on the glass surface showed that water drops had a round shape, small dimensions, and could easily flow down from the glass. In other words, the test confirmed that the wiper blade demonstrated good water-repellent properties.

COMPARATIVE EXAMPLE 3

A silicone rubber composition was prepared by the same method as in Example 2, with the exception that 100 mPa·s viscosity of the trimethylsiloxy-terminated-polydimethylpolysiloxane was changed to viscosity of 20000 mPa·s. A wiper blade was extruded from the obtained composition by the same method as in Comparative Example 1. The produced wiper blade had a correct cross-sectional configuration that clearly reproduced the shape of the die cavity. The wiper blade was free of warping, strains, and deviations from linearity. The surface of the extruded product was smooth and had an attractive appearance. Test of the produced wiper blade with regard to water-repellent properties against water on the glass surface showed that water drops spread over the glass surface in the form of a thin layer and that water-repellent properties against water on the glass surface appeared to be insufficient.

COMPARATIVE EXAMPLE 4

A silicone rubber composition was prepared using the same composition as Example 1 other than the exclusion of the orthoboric acid. A wiper blade was then produced from the resulting silicone rubber composition by the same method described in Comparative Example 1. The resulting wiper blade produced from the aforementioned composition had deviations from the correct profile and was produced with curved squeegee blade 10 and/or neck portions 11, and a distorted lower part of the holding portion 12 as compared to a correctly formed blade profile as seen in FIG. 3, or with sagging projections on the holding portion. In general, the cross section of the wiper blade (as shown in FIG. 3) was distorted in the vertical direction. The extruded product did not reproduce the shape of the die cavity, could not maintain its shape and deformed under its own gravity on the conveyor belt and in the hot-air curing oven prior to curing. The extent of deformation was worse than in the case of Comparative Example 2 because of a decrease in green strength of the silicone rubber composition caused by addition of a low-viscosity polydimethylsiloxane and a copolymer of methylhydrogensiloxane and dimethylsiloxane. The surface was smooth, glossy, and had good appearance.

COMPARATIVE EXAMPLE 5

A silicone rubber composition was prepared using the same composition as Example 1 other than the replacement of the powdered calcium carbonate with diatomaceous earth having an average grain diameter of: 19 μm and oil absorption: 180 ml/100 g. A wiper blade was then produced from the resulting silicone rubber composition by method of Comparative Example 1. The wiper blade produced from the aforementioned composition clearly reproduced all the details of the cross-sectional profile in accordance with the shape of the die cavity, and was free from any distortions in longitudinal direction of the blade, as well as from strains and deviations from linearity. However, the surface of the product had black stripes. A probable reason for this defect is the presence of the diatomaceous earth that imparted to the silicone rubber composition abrasive properties resulting in formation of products of wear as a result of abrasive friction between the silicone rubber composition and the inner walls of the extruder.

COMPARATIVE EXAMPLE 6

A silicone rubber composition was prepared using the same composition as Example 1 other than the fact that the amount of orthoboric acid was reduced to 0.001 parts. A wiper blade was then produced from the resulting silicone rubber composition by the same method as in Comparative Example 1. The wiper blade produced from the aforementioned composition had the cross section with a significantly curved neck portion. Although the degree of deformation was slightly lower than in Comparative Example 2, distortion was observed almost on the entire cross-sectional configuration. This was probably caused by the inability of the silicone rubber composition to reproduce the profile of the die cavity, whereby the thin portions in the cross section of extruded product were deformed under their own gravity on the conveyor belt and in the curing oven prior to curing. The surface was smooth, glossy, and had good appearance.

COMPARATIVE EXAMPLE 7

A silicone rubber composition was prepared using the same composition as Example 1 other than the fact that the amount of orthoboric acid was increased to 6 parts. A wiper blade was then produced from the resulting silicone rubber composition by the method of Comparative Example 1. The wiper blade produced from the aforementioned composition had in some portions changes in the outside diameter and lost linearity in the squeegee blade and on the holding portion. The above distortions were probably caused by a decrease in the output of the silicone rubber composition due to fluctuations in the amount of the composition at the outlet of the extruder that, in turn, caused distortions in the correct cross section and in the outside diameter of the extruded product. Some parts of the surface had roughness.

COMPARATIVE EXAMPLE 8

A silicone rubber composition was prepared by the same method as in Example 1, with the exception that the composition did not contain orthoboric acid and that 15 parts of the powdered calcium carbonate were replaced by 30 parts of a diatomaceous earth having an average grain diameter of: 19 μm and oil absorption: 180 ml/100 g. A wiper blade was then produced from the resulting silicone rubber composition by the method of Comparative Example 1. The wiper blade produced from the aforementioned composition had a cross section with a partially curved neck portion. A probable reason for this defect is that, in spite of a large amount of the diatomaceous earth, the product extruded from this silicone rubber composition could not accurately reproduce the cross section of the die cavity, whereby the thin portions in the cross section of extruded product were deformed under their own gravity on the conveyor belt and in the hot-air curing oven prior to curing. The surface of the product had a large number of black stripes. A probable reason for this defect was the presence of the diatomaceous earth that imparted abrasive properties to the silicone rubber composition resulting in formation of products of wear due to abrasive friction between the silicone rubber composition and the inner walls of the extruder. Comparison showed that the degree of contamination with the black stripes was worse than in the case of Comparative Example 5.

Results of tests described in aforementioned Examples 1 to 3 and in Comparative Examples 3 to 8 are shown in Table 2.

Since the silicone rubber composition of the present invention, which is particularly suitable for the preparation of wiper blades, contains aforementioned Components (A) through (E), in particular, orthoboric or metaboric acid (C) and a powdered calcium carbonate (D), it is suitable for extruding products such as wiper blades having intricate cross-sectional configurations. Furthermore, an addition of polyorganosiloxane (F) having a viscosity of 1 to 10000 mPa·s and containing in one molecule at least two silicon-bonded hydrogen atoms or a mixture of Component (F) with polydiorganosiloxane (G) having a viscosity of 1 to 10000 mPa·s imparts to the silicone rubber composition of the present invention improved extrudability and water-repellent properties against water on a glass surface.

Since the method of the present invention for manufacturing the aforementioned composition consists of two steps, where in Step 1 a silicone rubber base compound is prepared by heating and kneading the Components (A) to (C) under a temperature of at least 80° C. and in Step 2 the silicone rubber base compound obtained in Step 1 is combined with Component (D) and then with Component (E), and with Component (F) or Components (F) and (G) at any time during Step 2, especially because compounding of Components (A) and (B) occurs under the elevated temperature, the composition of the invention can be produced with high efficiency.

TABLE 2

| | (Units) | Ex. 1 | Ex. 2 | Ex. 3 | Comp. Ex. 3 | Comp. Ex. 4 | Comp. Ex. 5 | Comp. Ex. 6 | Comp. Ex. 7 | Comp. Ex. 8 |
|---|---|---|---|---|---|---|---|---|---|---|
| Polyorganosiloxane gum | wt. parts | 100 | 100 | 100 | 100 | 100 | 100 | 100 | 100 | 100 |
| Fumed Silica | wt. parts | 45 | 45 | 45 | 45 | 45 | 45 | 45 | 45 | 45 |
| Orthoboric acid | | 0.05 | 0.05 | 0.05 | 0.05 | — | 0.05 | 0.001 | 6 | — |
| Powdered calcium carbonate | wt. parts | 15 | 15 | 15 | 15 | 15 | — | 15 | 15 | — |
| Diatomaceous earth | wt. parts | — | — | — | — | — | 15 | — | — | 30 |
| Trimethylsiloxy-terminated Polydimethylsiloxane (100 mPa·s viscosity) | wt. parts | 1.0 | 2.0 | — | — | 1.0 | 1.0 | 1.0 | 1.0 | 1.0 |
| Trimethylsiloxy-terminated Polydimethylsiloxane (20000 mPa·s viscosity) | wt. parts | — | — | — | 2.0 | — | — | — | — | — |
| Trimethylsiloxy-terminated copolymer of methylhydrogensiloxane and dimethylsiloxane (5 mPa·s viscosity) | wt. parts | 1.0 | — | 2.0 | — | 1.0 | 1.0 | 1.0 | 1.0 | 1.0 |
| Bis(paramethylbenzoyl) peroxide (50 wt. % in mixture with silicone oil) | wt. parts per 100 wt. parts of silicone rubber base compound | 1.5 | 1.5 | 1.5 | 1.5 | 1.5 | 1.5 | 1.5 | 1.5 | 1.5 |
| Extrudability of wiper blade | | | | | | | | | | |
| Shape | | Good | Good | Good | Good | Entirely deformed | Good | Deformed cross section | Deformed cross section | Deformed cross section |
| Surface | | Good | Good | Good | Good | Good | Black stripes | Good | Partial rough-ness | Black stripes |
| Water-repellent properties on glass surface | | Good | Good | Good | None | NA* | NA | NA | NA | NA |

*Test was not conducted or was not practically possible.

What is claimed is:

1. A silicone rubber composition comprising the following components:
   (A) 100 parts by weight of a polyorganosiloxane gum,
   (B) 25 to 100 parts by weight of a finely divided, reinforcing silica filler,
   (C) 0.005 to 5.00 parts by weight of acid selected from the group consisting of (i) orthoboric acid and and (ii) metaboric acid,
   (D) 5 to 100 parts by weight of a powdered calcium carbonate,
   (E) an organic peroxide curing agent in an amount to be sufficient to effect curing of the composition,
   and an additive for improving water-repellent properties comprising a material selected from the group consisting of
   (F) a polyorganosiloxane having a viscosity of 1 to 10,000 mPa·s and containing in one molecule at least two silicon-bonded hydrogen atoms; and
   (G) a mixture of Component (F) with a polydiorganosiloxane having a viscosity of 1 to 10,000 mPa·s;
   in an amount of 0.1 to 20 parts by weight based on 100 parts by weight of said Component (A).

2. A composition in accordance with claim 1, wherein said Component (D) is a powdered calcium carbonate having a BET specific surface area of less than 8 $m^2/g$.

3. A composition in accordance with claim 1, wherein said Component (E) is selected from the group consisting of one or more of benzoyl peroxide, di-t-butylperoxide, 2.5-dimethyl-2.5-di(t-butylperoxide)hexane, bis(orthomethylbenzoyl)peroxide, bis(meta-methylbenzoyl)peroxide, bis(para-methylbenzoyl)peroxide, and a similar monomethylbenzoyl peroxide, bis(2,4-dimethylbenzoyl) peroxide, and a similar dimethylbenzoyl peroxide, bis(2,4,6-trimethylbenzoyl)peroxide and a similar trimethylbenzoyl peroxide.

4. A composition in accordance with claim 1 wherein Component (F) is selected from the group consisting of one or more of trimethylsiloxy-terminated polymethylhydrogensiloxane, trimethylsiloxy-terminated copolymer of methylhydrogensiloxane and dimethylsiloxane, dimethylhydrogensiloxy-terminated polydimethylsiloxane, dimethylhydrogensiloxy-terminated copolymer of methylhydogensiloxane and dimethylsiloxane, cyclic polymethylhydrogensiloxane, and cyclic copolymer of methylhydrogensiloxane and dimethylsiloxane.

5. A composition in accordance with claim 1 wherein Component (G) is selected from a group consisting of one or more of trimethylsiloxy-terminated polydimethylsiloxane, trimethylsiloxy-terminated polymethylphenylsiloxane, trimethylsiloxy-terminated copolymer of methylphenylsiloxane and dimethylsiloxane, polymethyl(3,3,3-trifluoropropyl)siloxane, trimethylsiloxy-terminated copolymer of methyl(3,3,3-trifluoropropyl)siloxane and dimethylsiloxane, cyclic polydimethylsiloxane, and cyclic polymethylphenylsiloxane.

6. A composition in accordance with claim 1 wherein the additive for improving water-repellent properties is present in the composition in an amount of from 1 to 8 parts by weight, for each 100 parts by weight of Component (A).

7. A composition in accordance with claim 1, suitable for forming an article by extrusion.

8. A method of manufacturing a silicone rubber composition comprising the following steps:
   i. preparing a silicone rubber base compound by heating and kneading the following components under a temperature of at least 80° C.:
      (A) 100 parts by weight of a polyorganosiloxane gum,
      (B) 25 to 100 parts by weight of a finely divided, reinforcing silica filler, and
      (C) 0.005 to 5.00 parts by weight of an acid selected from the group consisting if (i) orthoboric acid and (ii) metaboric acid,
   ii. combining the silicone rubber base compound obtained in Step i with
      (D) 5 to 100 parts by weight of a powdered calcium carbonate,
      (E) an organic peroxide curing agent in an amount to be sufficient to effect curing of the composition,
      and adding an additive for improving water-repellent properties comprising a material selected from the group consisting of
         (a) a polyorganosiloxane having a viscosity of 1 to 10,000 mPa·s and containing in one molecule at least two silicone-bonded hydrogen atoms;
         and (b) a mixture of Component (F) with
      (F) a polyorganosiloxane having a viscosity of 1 to 10,000 mPa·s; in an amount of 0.1 to 20 parts by weight based on 100 parts by weight
      said Component (A), at any time during step ii.

9. The method of claim 8, wherein said Component (D) is a calcium carbonate having a BET specific surface area of less than 8 $m^2/g$.

10. A method of making a wiper blade comprising manufacturing a composition in accordance with claim 8, extruding said composition and curing the resulting extruded composition.

11. A wiper blade made by forming the silicone rubber composition of claim 1 and curing the silicone rubber composition.

12. A method of improving the water repellant property of a wiper blade made by the extrusion and curing of components (A), (B), (C), (D), and (E) as defined in claim 1 comprising adding a polyorganosiloxane (F) having a viscosity of 1 to 10,000 mPa·s containing at least two silicon-bonded hydrogen atoms per molecule or a mixture of component (F) with polydiorganosiloxane (G) having a viscosity of 1 to 10,000 mPa·s to the mixture prior to extrusion and/or curing.

* * * * *